United States Patent

Matsuyama

(10) Patent No.: US 9,292,240 B2
(45) Date of Patent: Mar. 22, 2016

(54) IMAGE PROCESSING DEVICE, IMAGE PROCESSING METHOD, AND COMPUTER-READABLE STORAGE MEDIUM

(71) Applicant: Takejiroh Matsuyama, Kanagawa (JP)

(72) Inventor: Takejiroh Matsuyama, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/095,140

(22) Filed: Dec. 3, 2013

(65) Prior Publication Data

US 2014/0160514 A1  Jun. 12, 2014

(30) Foreign Application Priority Data

Dec. 10, 2012 (JP) .................... 2012-269603

(51) Int. Cl.
*G06K 15/00* (2006.01)
*G06F 3/12* (2006.01)
*H04N 1/32* (2006.01)
*G06F 15/00* (2006.01)

(52) U.S. Cl.
CPC .......... *G06F 3/1229* (2013.01); *H04N 1/32609* (2013.01)

(58) Field of Classification Search
CPC .............. H04N 1/0022; H04N 1/2166; H04N 11/32368; H04N 1/32374; H04N 1/32609; G06F 3/1229

USPC .............. 358/1.1, 1.2, 1.4, 1.5, 1.6, 1.9, 1.11, 358/1.12, 1.13, 1.14, 1.15, 1.16, 1.17, 1.18
See application file for complete search history.

(56) References Cited

U.S. PATENT DOCUMENTS

| 8,325,375 B2 | 12/2012 | Fujisawa | |
|---|---|---|---|
| 2005/0243366 A1* | 11/2005 | Fukuda | 358/1.15 |
| 2012/0300254 A1* | 11/2012 | Kato | 358/1.15 |
| 2013/0055036 A1* | 2/2013 | Fujisawa | 714/48 |

FOREIGN PATENT DOCUMENTS

| JP | 2004-351805 | | 12/2004 |
|---|---|---|---|
| JP | 2008015655 A | * | 1/2008 |
| JP | 2009-225317 | | 10/2009 |
| JP | 4872493 | | 12/2011 |

\* cited by examiner

*Primary Examiner* — Thierry L Pham
(74) *Attorney, Agent, or Firm* — Harness, Dickey & Pierce, PLC

(57) ABSTRACT

An information processing device includes a storage unit; a multiple programs executing unit configured to execute multiple programs; a log file recording unit configured to record pieces of log information output by the respective multiple programs as multiple log files, respectively, in the storage unit; and a collected log file recording unit configured to integrate the multiple log files into one collected log file and record the collected log file in the storage unit in a chronological order.

5 Claims, 7 Drawing Sheets

IMAGE PROCESSING DEVICE, IMAGE PROCESSING METHOD, AND COMPUTER-READABLE STORAGE MEDIUM

CROSS-REFERENCE TO RELATED APPLICATION

The present application claims priority to and incorporates by reference the entire contents of Japanese Patent Application No. 2012-269603 filed in Japan on Dec. 10, 2012.

BACKGROUND OF THE INVENTION

1. Field of the Invention

The present invention relates to an information processing device, an information processing method, and a computer-readable storage medium.

2. Description of the Related Art

Conventionally, information processing devices such as a printer and a facsimile communication device operate in response to a request from an outside like a personal computer (PC) and a communication line. Moreover, the information processing device operates, including transiting between an operation state in which a predetermined operation can be immediately performed in response to a reception of a request from the outside and a standby state in which functions are partially halted and an operation request is waited for, in accordance with complicated programs. Therefore, techniques of storing, as a log in an inside of the information processing device, operational information, status information, and error information of the information processing device to promptly ascertain whereabouts of the cause if a trouble arises in the information processing device.

As one of the techniques, a printing machine provided with a memory that stores working status information, error information, and operational information of a controller and a clock function has been known. The printing machine is provided with a control unit that controls the memory to store, as a history, information of an error that occurs during an operation, information of changed status, operational information of the controller, and combined information of the occurrence of the error and possibly the time of the change. This printing machine is disclosed in Japanese Laid-open Patent Publication No. 2004-351805, for example.

An information processing device so far has a problem, in a log storage function, that since complicated programs building the device store individual logs, there is a difficulty in tracking a relativity of the individual logs when a trouble over multiple programs occurs. For example, known is a technique that makes the tracking of relative parts easier by collecting all pieces of log information in response to a specific event as a trigger. This technique is disclosed, for example, in the paragraph [0020] in Japanese Patent No. 4872493.

In Japanese Patent No. 4872493, disclosed is a configuration of an information processing device provided with: a recording unit that records, for the purpose of collecting logs surely in an easy method and keeping a security of the logs with respect to the outside of the device, operational information, status information, and error information of the device as multiple log files in a storage unit provided in an inside of the device; an integrating/recording unit that integrates into one collected log file and records the multiple log files; a storing unit that stores the collected log file in a removable medium through encryption; and an erasing unit that erases the collected log file. The log file includes a debug log file in which a summary is recorded and a detailed log file in which a detail of the log is recorded. The integrating/recording unit that performs the integration and recording into one collected log file extracts only the debug log which is a part of each of the multiple log files and performs the integration/recording into one collected debug log file.

However, the technique disclosed in Japanese Laid-open Patent Publication No. 2004-351805 adopts a method of writing an entire operation history in a single log file. Therefore, there has been a problem of having a difficulty, in an image forming apparatus in which complicated programs building the device store individual logs, in tracking the relativity of the logs when a trouble over multiple programs occurs even though operational information of the device, status information, and error information is recorded, as a log file, in the storage unit provided in the inside of the device.

While the technique disclosed in Japanese Patent No. 4872493 is capable of collecting logs in a specific event, it is necessary to simulate events at which log information is collected in advance and it is possible to obtain log information only in events intended by a designer of the log storing method. Specifically, while storing debug logs collectively in one file, the technique disclosed in Japanese Patent No. 4872493 has a problem of having a difficulty in collecting debug log information over multiple programs to deal with a trouble having occurred at an unintended timing.

Therefore, there is a need for improving an information tracking performance in an occurrence of a trouble over multiple programs in an information processing device.

SUMMARY OF THE INVENTION

It is an object of the present invention to at least partially solve the problem in the conventional technology.

According to an embodiment, there is provided an information processing device that includes a storage unit; a multiple programs executing unit configured to execute multiple programs; a log file recording unit configured to record pieces of log information output by the respective multiple programs as multiple log files, respectively, in the storage unit; and a collected log file recording unit configured to integrate the multiple log files into one collected log file and record the collected log file in the storage unit in a chronological order.

According to another embodiment, there is provided an information processing method to be executed by an information processing device including a storage unit. The information processing method includes executing multiple programs; recording pieces of log information output by the respective multiple programs as multiple log files, respectively, in the storage unit; and integrating the multiple log files into one collected log file and record the collected log file in the storage unit in a chronological order.

According to still another embodiment, there is provided a non-transitory computer-readable storage medium with an executable program stored thereon. The program instructs a computer including a storage unit to execute: executing multiple programs; recording pieces of log information output by the respective multiple programs as multiple log files, respectively, in the storage unit; and integrating the multiple log files into one collected log file and record the collected log file in the storage unit in a chronological order.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An exemplary embodiment of an information processing device, an information processing method, and a program according to the present invention will be explained below with reference to the accompanying drawings.

Embodiment

An embodiment of the present invention relates to a log collecting technique with regard to an operation of an information processing device such as a communication device like a printer device and a facsimile device, especially to a technique enabling an analysis on a trouble when the trouble occurs. More specifically, a process when multiple programs on the information processing device store individually debug log information at their own timings is featured as follows. In the present invention, when exceeding respective volumes for respective specific threshold values which are optimized for the respective programs, respective pieces of log information stored by the multiple programs in their own dedicated areas at their own timings are collected on a cache each time when the respective pieces of log information are accumulated. Then, information close in a temporal sequence is collected as one set of data and written in, for example, a hard disk drive (HDD) as a secondary storage device. In the description of the present invention, an operation of recording log information in the multiple programs in a predetermined file is referred to as "log collection" or simply "collection". A specific example will be explained below.

Figure 1:
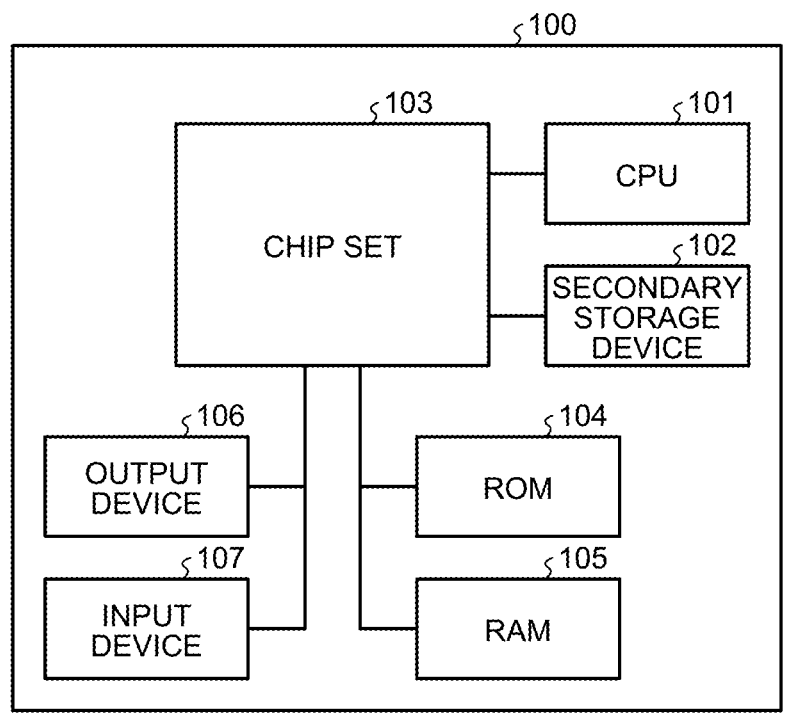
FIG. 1 is a block diagram of a hardware configuration of an information processing device according to an embodiment.

FIG. 1 is a block diagram of a hardware configuration of an information processing device according to an embodiment. As illustrated in FIG. 1, an information processing device 100, which mounts a microcomputer system, is provided with a CPU 101, a secondary storage device 102, a chip set 103, a ROM 104, a RAM 105, an output device 106, and an input device 107.

The CPU 101 executes an operating system (OS) and a controlling program to serve a function of controlling an operation of the information processing device 100. The RAM 105 is a volatile memory which is used as a work space of the CPU 101. The ROM 104 is a non-volatile memory in which programs that are executed by the CPU 101, expanded on the RAM 105, and executed by the CPU 101 are stored.

The output device 106 presents information to a user of the information processing device 100 when a program causes the CPU 101 to instruct an output. The input device 107 allows the user of the information processing device 100 to input an instruction to a program that operates on the device.

Figure 2:
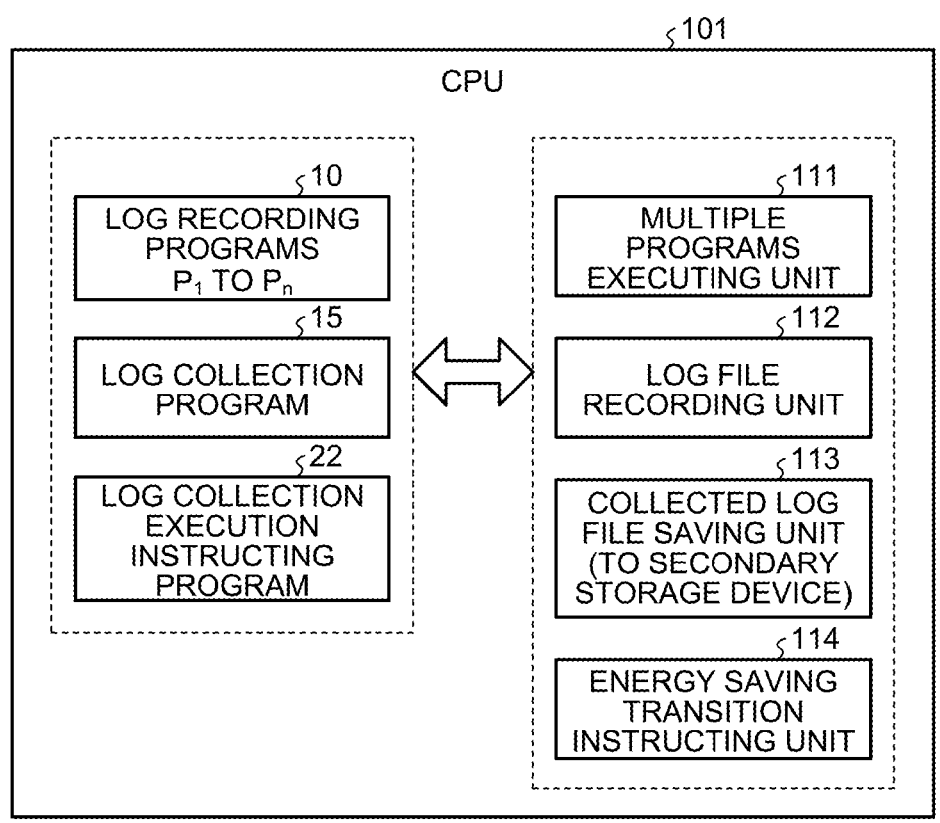
FIG. 2 is a block diagram of a functional configuration of the CPU in FIG. 1.

FIG. 2 is a block diagram of a functional configuration of the CPU 101 in FIG. 1. The CPU 101 has functions of a multiple programs executing unit 111, a log file recording unit 112, a collected log file saving unit 113, and an energy saving transition instructing unit 114, as explained later. A log in the present embodiment includes at least operational information, status information, and error information of the device. The error information includes trouble information regarding an occurrence of jam (paper jam), an event that an operation is not performed at a given sequence, and the like in the case of an image forming apparatus, for example.

The multiple programs executing unit 111 causes multiple programs to operate independently in the device. Specifically, the multiple programs executing unit 111 has a function of causing a plurality of log recording programs (P1 to Pn) 10, a log collection program 15, and a log collection execution instructing program 22 to be executed, as illustrated in FIG. 3 which will be explained later.

The log file recording unit 112 records, as multiple log files, the operational information, status information, and error information of the device for log in the secondary storage device 102 using, for example, a hard disk drive (HDD). The collected log file saving unit 113 integrates the multiple log files to one collected log file and saves the collected file in caches 102a, 102b, 102c, of the secondary storage device 102 for example in the chronological order.

The energy saving transition instructing unit 114 instructs a transition to a low voltage driving condition in which a power supply at a standby state is set to be lower than a voltage at a normal driving condition. Specifically, the energy saving transition instructing unit 114 instructs the transition to the lower voltage driving condition (energy saving mode) regularly or when no operation is performed for not less than a certain period of time for the purpose of suppressing a power consumption of the information processing device 100. In the energy saving mode in the case of a xerographic image forming apparatus, a heater of a thermal fixing device whose power consumption is large is lit to be lower in temperature than a normal lighting. Or, power consumption is suppressed at a predetermined part in the energy saving mode, for example by turning off the light of a panel display of an operation display unit.

Figure 3:
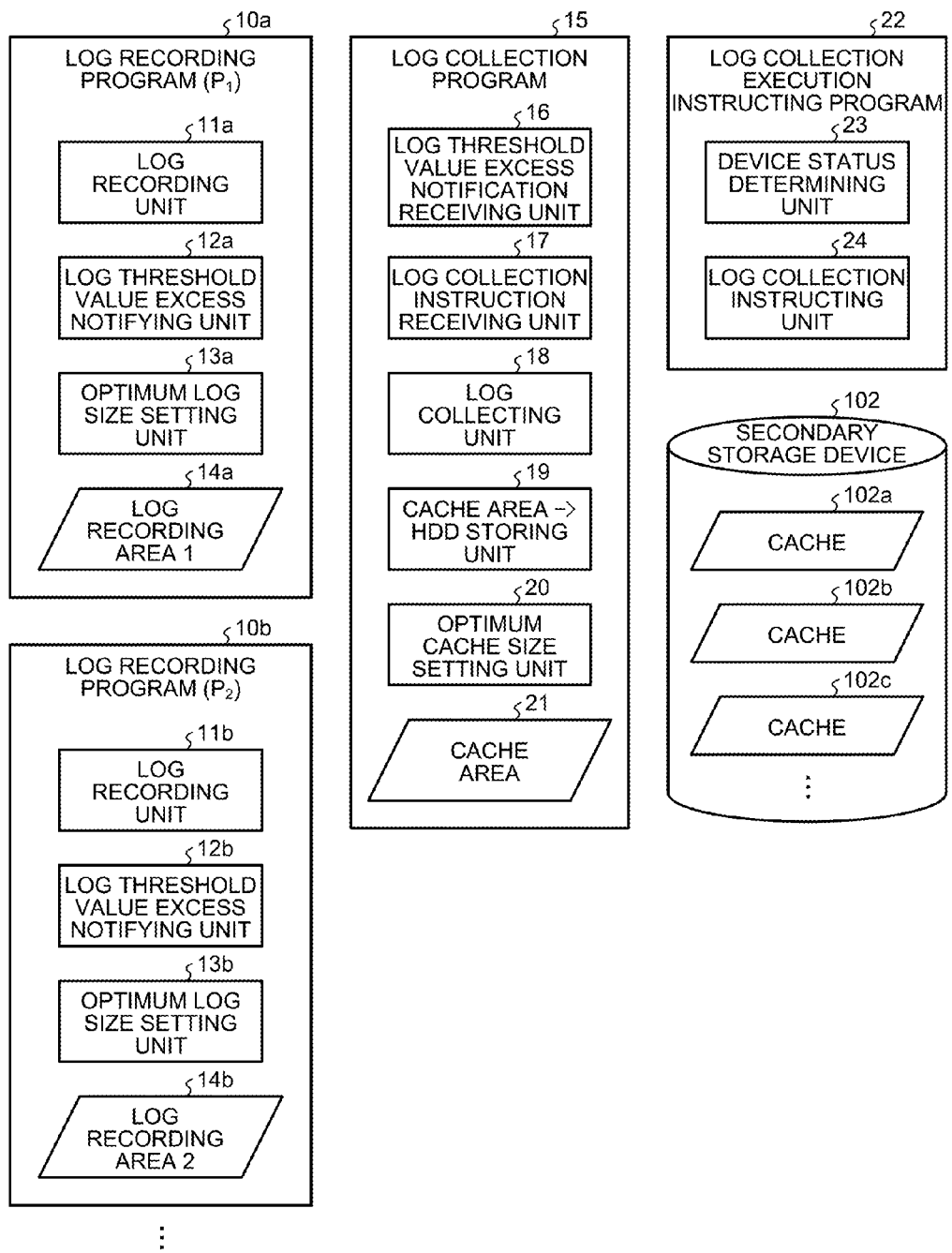
FIG. 3 is an explanatory view of a configuration and a brief operation of a program that causes a scatter gather log to be stored.

FIG. 3 is an explanatory view of a configuration and a brief operation of a program that causes a scatter gather log to be stored. For example, multiple programs store individual pieces of debug log information at their own timings in the information processing device 100. The multiple programs include log recording programs 10a and 10b, the log collection program 15, and the log collection execution instructing program 22.

The log recording programs 10a and 10b that cause logs to be stored are provided with log storage units 11a and 11b, log threshold value excess notifying units 12a and 12b, and optimum log size setting units 13a and 13b, respectively. The log recording units 11a and 11b record and store logs. The log threshold value excess notifying units 12a and 12b provide a notification to the log collection program 15 when a log exceeds a predetermined threshold value. The optimum log size setting units 13a and 13b set an optimum size of the logs. Here, the threshold value represents a data capacity.

Though being storage areas secured in the RAM 105 in fact, log recording areas 14a and 14b are areas in which logs are stored and illustrated in FIG. 3 in respective programs by assuming that the log recording areas 14a and 14b are provided for storage in the log recording programs 10a and 10b for the sake of convenience.

The log collection program 15 is provided with a log threshold value excess notification receiving unit 16, a log collection instruction receiving unit 17, a log collecting unit 18, an HDD storing unit 19, and an optimum cache size setting unit 20. The log threshold value excess notification receiving unit 16 receives information, notified from the log threshold value excess notifying units 12a and 12b, of the excess over the log threshold value. The log collection instruction receiving unit 17 receives a communication from the log collection instructing unit 24 of the log collection execution instructing program 22 and retains a state of whether or not the device is allowed to collect logs. The log collecting unit 18 collects logs in a cache area 21. The HDD storing unit 19 is provided with the optimum cache size setting unit 20 that performs a storage process from the cache area 21, which will be explained later, to the HDD (the secondary storage device 102). The optimum cache size setting unit 20 sets a size of the cache area 21 in advance as an optimum value.

The log collection execution instructing program 22 is provided with a device status determining unit 23 that determines whether or not a collecting operation by the log collection program 15 can be performed and the log collection instructing unit 24 that instructs a log collection.

For the secondary storage device 102, an HDD is used, for example. A plurality of caches, for example 102a, 102b, and 102c are configured to be stored in the secondary storage device 102.

There are three kinds of information recorded as the logs. There are multiple log recording programs on the information processing device 100 and the log recording programs 10a and 10b are respectively provided with the dedicated log recording areas 14a and 14b provided by the optimum log size setting units 13a and 13b. Since the log recording areas 14a and 14b are set by the optimum log size setting units 13a and 13b of the log recording programs 10a and 10b, respectively, the area sizes are not fixed.

The log collection program 15 is provided with the cache area 21 provided by the optimum cache size setting unit 20. Though being an area in which a cache to be explained later is stored and being in fact a storage area secured by the RAM 105, the cache area 21 is illustrated in FIG. 3 in the log collection program 15 for the sake of convenience on the assumption that the cache area 21 is provided for storage in the log collection program 15.

The information processing device 100 includes a plurality of cache areas 21 in the secondary storage device 102 to store logs collected by the log collecting unit 18. The cache areas 21 transferred onto the secondary storage device 102 are retained as past cache data 102a, 102b, 102c . . . for a certain period of time.

Next, an operation of the log recording unit 11a with respect to the log recording area 14a according to the log recording program 10a will be explained. When the log recording program 10a in the information processing device 100 operates by some operations, the log recording program 10a causes the log recording unit 11a to execute an operation of keeping writing logs in the log recording area 14a at a timing defined by the designer.

The log recording program 10a causes the log threshold value excess notifying unit 12a to operate on an excess over the threshold value defined in advance with respect to the log recording area 14a and give a notification of the excess over the threshold value to the log threshold value excess notification receiving unit 16 provided in the log collection program 15. The threshold value on this occasion is a log data size for which the log collecting unit 18 performs the collection and an area for the log data size in the log area 14a will be hereinbelow referred to as "chunk".

When receiving the notification from the log threshold value excess notifying unit 12a, the log threshold value excess notification receiving unit 16 makes an inquiry to the log collection instruction receiving unit 17, the log collecting unit 18 operates when the device is in a condition that the log may be collected, and the log area 14a is read as a chunk and written and stored in the cache area 21. On the other hand, when the log threshold value excess notification receiving unit 16 makes an inquiry to the log collection instruction receiving unit 17 and the device is not in the condition that the log may be collected, the log threshold value excess notification receiving unit 16 waits for a next notification from the log threshold value excess notifying unit 12a without performing anything.

By the functions of the log recording programs 10a and 10b and the log collecting unit 18, the cache area 21 in which different chunks by the multiple log recording programs 10a and 10b are joined in the chronological order and stored is generated. Then, each time when data is accumulated in the cache area 21, the data is sequentially stored on the secondary storage device 102 as cache data 102a, 102b, 102c . . . and retained for a certain period of time.

Specific threshold values used in the log collection are optimized in advance and set for each of the log recording programs 10a and 10b. Each time of an excess over the capacity for the specific threshold value set in advance for each program, the log recording programs 10a and 10b collect logs in an order of the excess over the threshold value set in advance.

The log collection execution instructing program 22 determines whether or not to work the log collecting function. There is a case, for example, where the device transits to an energy saving mode by the energy saving transition instructing unit 114 and the power source of the secondary storage device 102 (HDD in the present embodiment) is turned off. If the log collecting function is executed and the writing to the secondary storage device 102 which is not powered is attempted on this occasion, a trouble occurs.

To prevent such a situation, the log collection execution instructing program 22 causes the device status determining unit 23 to determine whether or not to execute the log collecting function and the log collection instructing unit 24 to instruct an operation or a stop to the log collection program 15.

Figure 4:
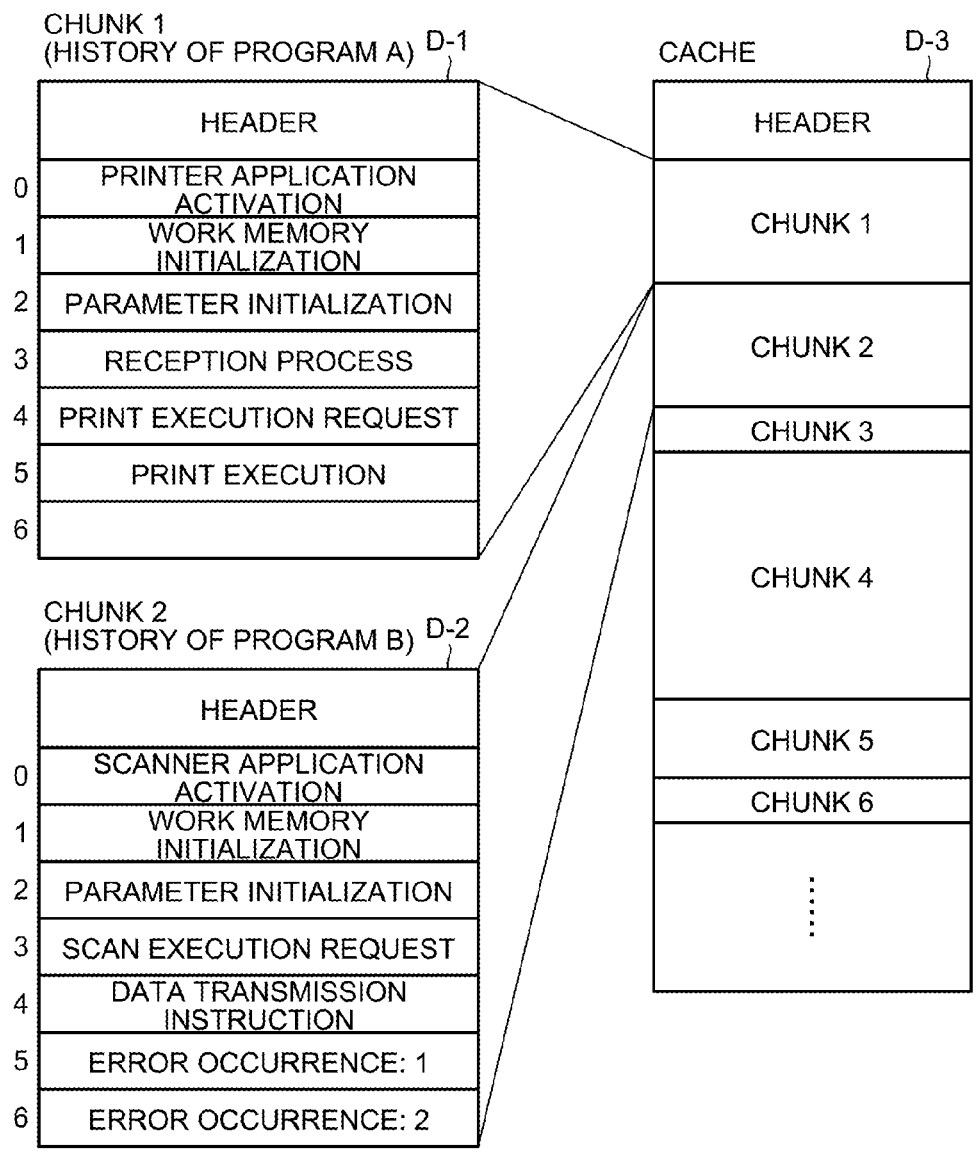
FIG. 4 is an explanatory view of an example of data contents of information of various kinds.

FIG. 4 is an explanatory view of an example of data contents of information of various kinds. Here, an operation example in which the information of various kinds in FIG. 4 arises and is updated will be explained. Programs in the present embodiment indicate an operating system (OS), a service program, and an application and the image of the programs include software and middleware.

Here, a storage of data of three kinds, error history, status information, and operational information in two programs, a program A and a program B, is taken as an example. The power source of the information processing device 100 is turned on and the program A operates. On the operation of the program A, a dedicated log recording area is secured on the RAM 105 and a log is added and recorded as needed in the RAM 105 in accordance with the convenience of the operation of the program A.

As illustrated in FIG. 4, information regarding a printer application activation, a work memory initialization, a parameter initialization, a reception process, a print execution request, and a print execution is stored in a chunk D-1 as history information of the program A. The chunk D-1 corresponds to an operation state of a printer unit 302 (see FIG. 7) which will be explained later, for example.

Besides, information regarding a scanner application activation, a work memory initialization, a parameter initialization, a scan execution request, a data transmission instruction, and an error occurrence condition is stored in a chunk D-2 as history information of the program B, as illustrated in FIG. 4. The chunk D-2 corresponds to an operation state of a scanner unit 301 (see FIG. 7) which will be explained later, for example.

When recording a certain volume of log, the program A causes the log threshold value excess notifying unit 12a illustrated in FIG. 3 to give a notification to the log threshold value excess notification receiving unit 16 of the log collection program 15 and causes the log collection program 15 to collect the certain volume of log in a cache D-3 as the chunk D-1. Multiple programs (as many as two hundreds programs in fact though two programs, the program A and the program B are illustrated in FIG. 4 of the present embodiment) operate in parallel on the information processing device 100, and each of the programs performs the log collecting operation as explained.

All the programs on the information processing device 100 perform the log recording and the collecting operation for their own conveniences in this manner, as a result of which programs are stored in the cache D-3 in a state where chunks for various programs are mixed.

Figure 5:
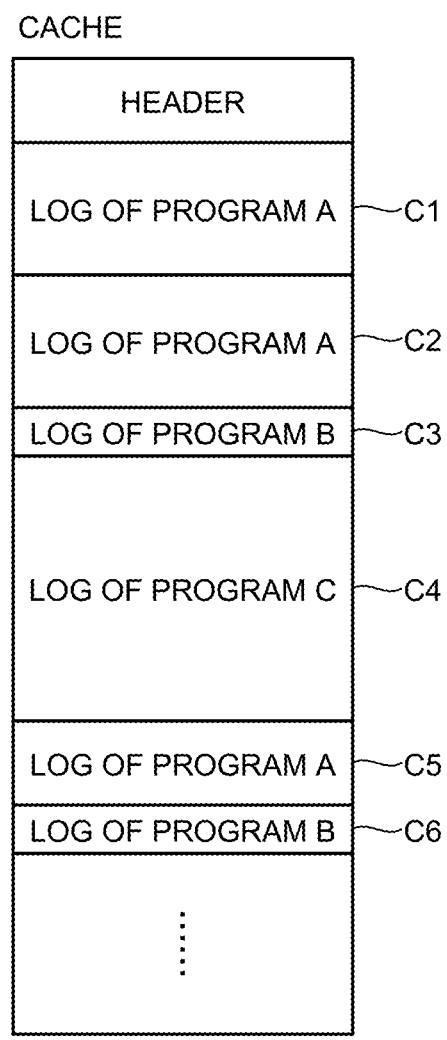
FIG. 5 is an explanatory view of an example of improving, by a log created by a present function, a tracking performance of trouble information over multiple programs.

FIG. 5 is an explanatory view of an example of improving, by a log created by the present function, a tracking performance of trouble information over multiple programs. In the information processing device 100 in which multiple programs (the log recording programs 10a and 10b in the present embodiment) store individual pieces of debug log information at their own timings, for example, there is a situation where a trouble is caused by and over multiple programs and there is a difficulty in figuring out a root cause. If a particular point where the trouble is turned out to be occurring is recognized on this occasion, it becomes possible to guess and investigate an indirect behavior by investigating a status of each chunk in the cache in the vicinity of the point. Specifically, it is possible to grasp the operation status of the device and the condition of the trouble occurrence by tracking chunks in each of the caches 102a, 102b, 102c, . . . of the secondary storage device 102.

Next, the improvement example will be explained based on the cache example created by the function related to the log collection of the present embodiment as illustrated in FIG. 5. In the example in FIG. 5, chunks from a log C1 of the program A to a log C6 of the program B in the cache are aligned in the chronological order and stored for the operational convenience of the programs A, B, and C. FIG. 5 shows that the log C1 of the program A is the oldest in the history of the operation and the log C6 of the program B is the latest in the history of the operation.

Here, it is assumed in the example that the point where the trouble occurs during the operation of programs is in the middle of the log C4 of the program C as illustrated in FIG. 5. When the point where the trouble occurs is in the log C4 of the program C, however, the cause of the trouble lies in a location other than the log C4 of the program C, it is, of course, impossible to specify the location where the trouble occurs with all the tracking investigation.

However, the following is found by checking the programs around the log C4 of the program C as illustrated in FIG. 5. Specifically, the log C1, the log C2, and the log C5 output by the program A and the log C3 and the C6 output by the program B are present, which shows that the logs of the program A and logs of the program B operate actively. It is therefore possible to specify the cause of the occurrence of the trouble by investigating the chunks around the log C4 of the program C.

Figure 6:
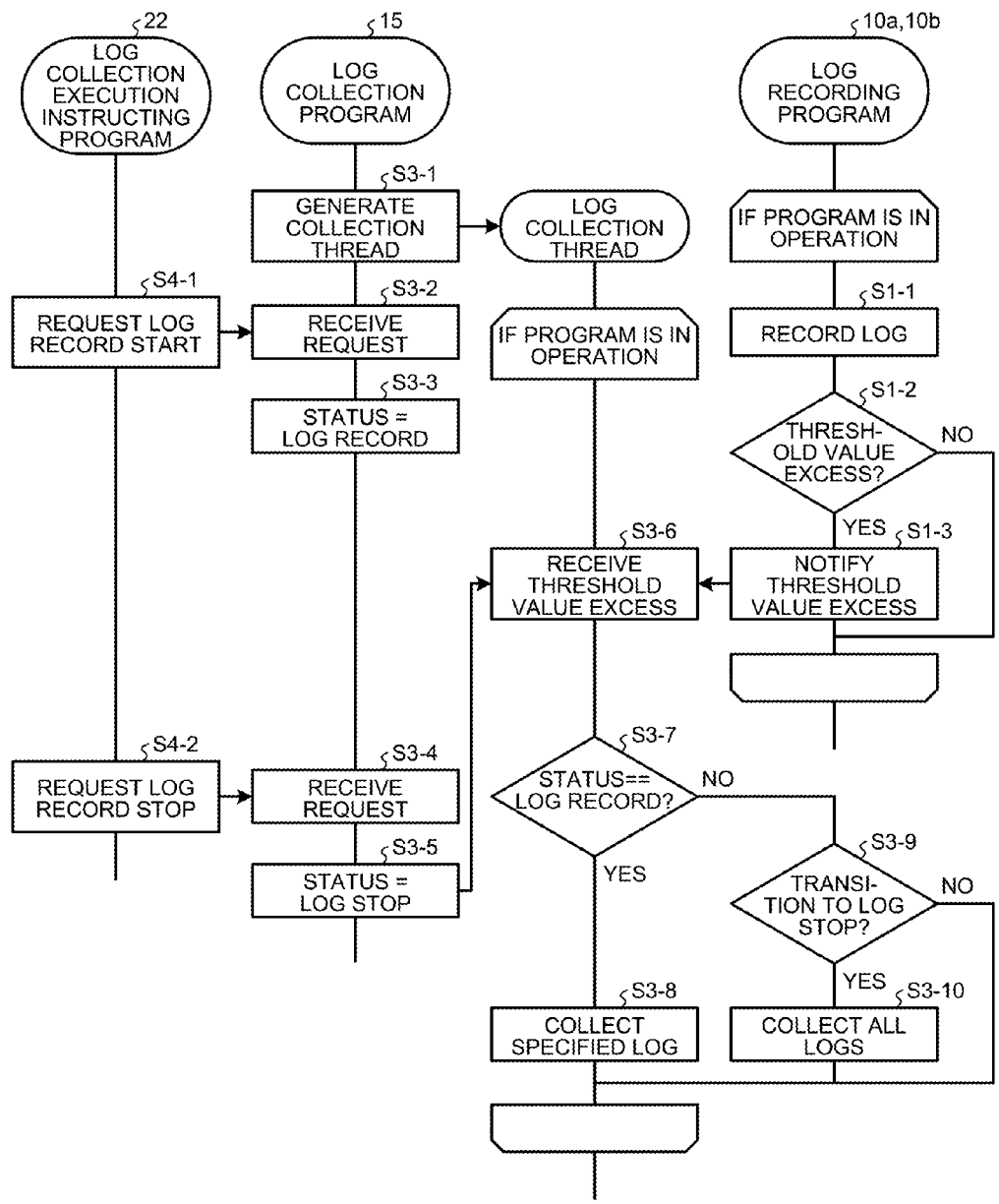
FIG. 6 is a sequence diagram of a timing of switching between a log record and a log stop, and a recordable span based on a relation of an energy saving transition instructing unit, a log collecting program, and log recording programs.

FIG. 6 is a sequence diagram of a timing of switching between a log record and a log stop, and a recordable span based on a relation of the energy saving transition instructing unit 114, the log collection program 15, and the log recording programs 10a and 10b.

This sequence shows a case of causing the log recording programs 10a and 10b prepared as the multiple programs explained with reference to FIG. 3, the log collection program 15, and the log collection execution instructing program 22 to be executed by the multiple programs executing unit 111 (see FIG. 2). The log file recording unit 112 collects multiple log files (operational information, status information, and error information of the device) obtained via the log collection program 15. For example, the multiple log files (operational information, status information, and error information of the device) are recorded in the secondary storage device 102. The collected log file saving unit 113 integrates the multiple log files (operational information, status information, and error information of the device) obtained via the log collection program 15 into one collected log file and saves the collected log file in the secondary storage device 102.

In FIG. 6, the reference symbols 10a and 10b denote the log recording programs explained with reference to FIG. 3. The reference symbol S1-1 denotes the operation of the log recording units 11a and 11b explained with reference to FIG. 3. After the recording at step S1-1, whether or not the log exceeds the predetermined threshold value (S1-2). When the recorded log exceeds the threshold value at step S1-2 ("Yes" at step S1-2), the log threshold value excess notifying units 12a and 12b notify the excess over the threshold value (step S1-3).

The reference symbol 15 in FIG. 6 denotes the log collection program explained with reference to FIG. 3. The log collection program 15 creates a collection thread as a unit for a log collection process (S3-1) and activates the log collecting unit 18 as the log collection thread. The log collection program 15 receives a log record start request (S4-1) from the log collection execution instructing program 22 (S3-2) and changes an internal status of the log collection program 15 in response to the instruction from the log collection execution instructing program 22 (S3-3). The log collection program 15 then starts the log recording.

In FIG. 6, the log collection instruction receiving unit 17 of the log collection program 15 receives an instruction for a log record stop request (S4-2) from the log collection instructing unit 24 of the log collection execution instructing program 22 (S3-4). In response to the log record stop request (S4-2) received from the log collection instructing unit 24 of the log collection execution instructing program 22, the log collection program 15 stops the log collection (S3-5).

The reference symbol S3-6 in FIG. 6 denotes the operation of the log threshold value excess notification receiving unit 16 explained with reference to FIG. 3. Here, the log threshold value excess notification receiving unit 16 of the log collection program 15 receives the log record stop request from the log collection execution instructing program 22 (S4-2, S3-4, and S3-5). Then, the log having exceeded the threshold value is received from the log threshold value excess notifying units 12a and 12b of the log recording programs 10a and 10b (S3-6). It should be noted that the log threshold value excess notification receiving unit 16 of the log collection program 15 concurrently serves to receive the notification when the process at step S3-5 occurs.

The reference symbols S3-8 and S3-10 in FIG. 6 denote the log collecting operation of the log collecting unit 18. When the status is a normal log collection in a determining process at S3-7 ("Yes" at step S3-7), a collection of a specified log is performed (S3-8) to collect a log of a program with which the log threshold value excess notification receiving unit 16 communicated.

In contrast, when the log record stop request (S4-2) is issued by the log collection execution instructing program 22 in the determination process at step S3-7 ("No" at step S3-7), whether or not the status is in the middle of transition to the log stop (S3-9). When the status is in the middle of the transition to the log stop here ("Yes" at step S3-9), the all log collection is performed (S3-10). On this occasion, all the log recording areas 14a and 14b on the information processing device 100 are searched, irrespective of the presence of the communication of the log threshold value excess notification receiving unit 16 and the difference in content in the logs after the last log collection is collected to the cache area 21, irrespective of the volume.

The reference symbol 22 in FIG. 6 denotes the log collection execution instructing program explained with reference to FIG. 3. The device status determining unit 23 illustrated in FIG. 3 determines whether or not the collecting operation can be performed by the log collection program 15 and issues the log record start request (S4-1) and the log record stop request (S4-2) to the log collection program 15.

The log record start request (S4-1) of the log collection execution instructing program 22 in FIG. 6 is issued when the information processing device 100 transits to a state in which the log collecting function may be executed. For example, the log record start request (S4-1) of the log collection execution instructing program 22 is issued when a preparation for writing in the HDD as the secondary storage device 102 is made in the start-up of the information processing device 100.

The log record stop request (S4-2) of the log collection execution instructing program 22 in FIG. 6 is issued before the information processing device 100 transits to a state in which the log collecting function cannot be executed. For example, the log record stop request (S4-2) is issued before a program whose process is of very high priority in the information processing device 100 and whose turnaround time is set strictly operates. The log record stop request (S4-2) is also issued before the power source of the HDD as the secondary storage device 102 is shut off before the device transits to the energy saving mode by the energy saving transition instructing unit 114 before the device stops.

Therefore, the span in which logs are collected, to the cache area 21, the log collecting function is effective is as follows. The log collection program 15 returns a response to the log record start request (S4-1) instructed by the log collection execution instructing program 22. The span is during a condition after the response to the log record start request is returned until the log collection program 15 returns a response to the log record stop request (S4-2) instructed by the log collection execution instructing program 22.

Since the log recording programs 10a and 10b are not affected by the instruction from the log collection execution instructing program 22, the span in which the log recording function is effective is a period from the activation to the end of the programs corresponding to the log recording programs 10a and 10b.

In the present embodiment, the collected log file saving unit 113 saves log information output by the multiple programs onto the memory (the secondary storage device 102, for example) in the following manner. Specifically, the collected log file saving unit 113 sequentially collects logs to the caches 102a, 102b, 102c, . . . on the system each time of the excess over the specific threshold value optimized for each of the programs. The order of the collection of the log information here is the order in which log information exceeds the threshold value and lumps (chunks) each as a unit of the collection of log information for each of the multiple programs line up in the caches 102a, 102b, 102c, . . . (see the cache in FIG. 5).

The information processing device 100 transits, by the energy saving transition instructing unit 114, to a low voltage driving condition (energy saving mode) regularly or at a timing when the device is not operated for not less than a certain period of time for the purpose of suppressing a power consumption. In the energy saving mode by the energy saving transition instructing unit 114, all the differences in debug logs stored by the multiple programs are collected. Debug log contents of the multiple contemporary programs are thus surely stored at this point.

Hence, there is an advantage expected in the information processing device 100 in which the multiple programs store individual logs on the memory as follows. Specifically, it is possible to improve an information tracking performance in an occurrence of a trouble over multiple programs at a timing not intended by a designer in a log storage program.

Since it is possible by optimizing and adjusting the specific threshold value by the optimum cache size setting unit 20 to suppress a writing frequency to the HDD (the secondary storage device 102) to the minimum, there is an advantage of suppressing degradation in performance.

Specifically, respective pieces of logs are collected constantly and joined along the chronological order in the information processing device 100 in which the multiple programs individually and uniquely store logs on the memory. Each time when the collected logs are recorded up to respective predetermined volumes (volumes specified by the threshold values set in advance), the collected logs are stored as one collected debug log file.

It thus becomes possible to provide a log storage function with an improved tracking performance of trouble information at the same time while suppressing the degradation in performance. This function enables constantly storing consecutive information obtained by constantly collecting and joining logs in, for example, the secondary storage device 102. It is thus possible to improve the information tracking performance in regard to the occurrence of a trouble over multiple programs at a timing which is not intended by the designer of the log storage program.

Moreover, it is possible by adjusting and optimizing the specific threshold value optimized for each program by the optimum cache size setting unit 20 of the log collection program 15 to suppress a frequency and a load of the log collection. It is also possible by optimizing and adjusting the cache size to suppress a writing frequency to the HDD (the secondary storage device 102).

The information processing device 100 monitors the status of the device and uses the energy saving transition instructing unit 114 to regularly transit to the low voltage driving condition (energy saving mode) for the purpose of suppressing the power consumption. Since all the differences of the debug logs stored by the multiple programs are collected on this occasion, it is possible to surely store the debug log contents of the multiple programs in the same period at this point. Here, the location, driven with the low voltage, of each unit of the device in the energy saving mode is determined in advance.

Figure 7:
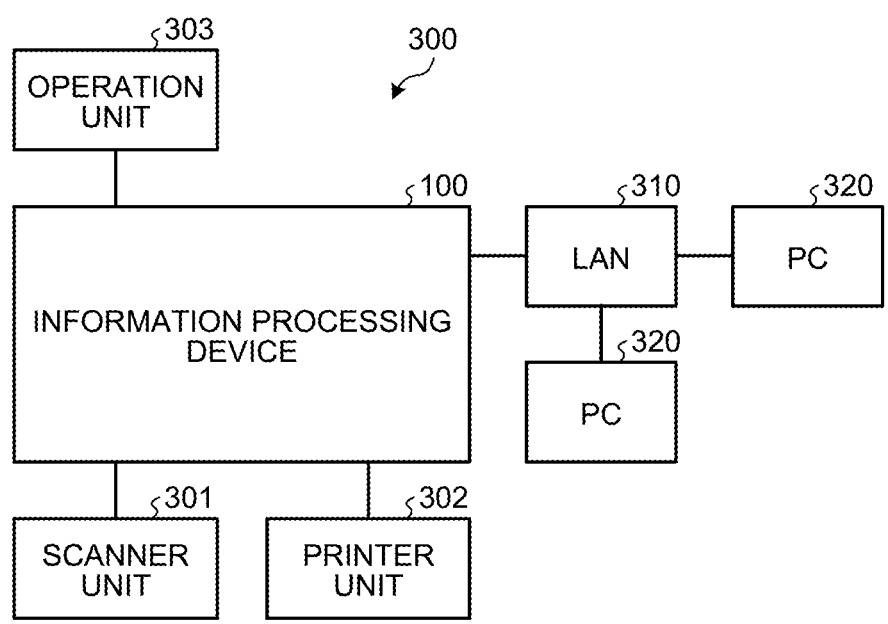
FIG. 7 is a block diagram of a configuration example of applying the information processing device according to the embodiment to an image forming apparatus.

FIG. 7 is a block diagram of a configuration example of applying the information processing device according to the present embodiment to an image forming apparatus. Here, the information processing device 100 can be applied to an image forming apparatus which is provided with a scanner unit, a printer unit, and the like and has a multiple function and a communicating function as illustrated in FIG. 7.

In FIG. 7, the reference symbol 300 denotes an image forming apparatus such as a multifunction peripheral (MFP) including a plurality of functions such as a scanning function, a printing function, and a facsimile function. The reference symbol 301 denotes a scanner unit including a function of scanning a document image and the reference symbol 302 denotes a printer unit that prints the image on a sheet of recording paper. The reference symbol 303 denotes a group of input keys that enable inputting operation of various kinds by a user and an operation unit including a function of displaying the status of the device on a panel.

In FIG. 7, the reference symbol 310 denotes a local area network (LAN) that functions as a network of an environment of the user and the reference symbol 320 denotes a plurality of personal computers (PC) connected to the information processing device 100 to communicate with each other via the LAN 310. The Ethernet® is used for the LAN 310, for example.

Specifically, the image forming apparatus 300 illustrated in FIG. 7 is provided with at least a communication printing function by which print data from the PC 320 via the LAN 310 is printed by the printer unit 302. The image forming apparatus 300 is also provided with a function of scanning a document image by the scanner unit 301 and printing the image data by the printer unit 302.

Here in the image forming apparatus illustrated in FIG. 7, assumed is a trouble in the scanner unit 301 in the process of printing the image scanned by the scanner unit 301 on a sheet of recording paper by the printer unit 302 in accordance with the instruction input through the operation unit 303.

In this case, a history of the printer unit 302 (chunk D-1) and a history of the scanner unit 301 (chunk D-2) are stored as the cache D-3 in the information processing device 100 as already explained with reference to FIG. 4. On this occasion, the log file saving unit 113 of the information processing device 100 constantly collects and joins pieces of logs along the chronological order via the log collection program 15. The collected log including operational information and error information is stored as one collected debug log file in the caches 102a, 102b, 103c, . . . of the secondary storage device 102 like the HDD each time when the log is recorded up to the predetermined volume (value specified by a threshold value set in advance).

A series of operations from an operation, by the scanner unit 301, of scanning the document to an operation, by the printer unit 302, of forming an image are performed. Thus, logs concerning the operational information over the multiple programs for the series of operations and information at the occurrence of any trouble (error occurrence condition) are collected and joined in the chronological order. By specifying the log when the trouble occurs, a condition at the time when the trouble occurs is tracked. It is thus possible to improve the tracking performance when a trouble occurs.

While the example of applying the information processing device 100 to the image forming apparatus 300 as a multifunction peripheral is illustrated, the present invention is not limited thereto. For example, the present invention is applicable to a configuration of an image forming apparatus such as a copying machine, a printer, a facsimile device. In addition, the present invention is applicable to a system in which a peripheral device like a paper after-treatment device is connected to the image forming apparatus. A paper after-treatment device performs a predetermined treatment with respect to a sheet of recording paper discharged from the image forming apparatus 300, as generally known. The after-treatment includes a punching function of punching a sheet of recording paper, a paper folding function of folding a sheet of paper, a stapling function of stapling sheets of paper, a sorting function of sorting for each print job, a stack fitting function of discharging sheets of paper in a stack and causing the discharged sheets of paper to fit together, and the like.

While the programs executed in the present embodiment are configured to be installed in advance and provided in the ROM 104, the present invention is not limited thereto. The programs executed in the present embodiment may be recorded in a storage medium capable of being read by a computer and provided as a computer program product. For example, the programs may be recorded in a file of an installable format or an executable format in a storage medium, such as a CD-ROM, a flexible disc (FD), a CD-R, and a digital versatile disk (DVD), capable of being read out by a computer.

The programs executed in the present embodiment may be configured to be provided by being stored on a computer connected to a network such as the Internet and downloaded via the network. The programs executed in the present embodiment may be configured to be provided or distributed via the network such as the Internet.

The programs executed in the present embodiment have a configuration of module including the multiple programs executing unit 111, the log file recording unit 112, the collected log file saving unit 113, and the energy saving transition instructing unit 114. For an actual hardware, the CPU 101 (processor) reads out and executes programs from the storage medium, so that the units explained above are loaded on the main storage device such as the RAM 105. The multiple programs executing unit 111, the log file recording unit 112, the collected log file saving unit 113, and the energy saving transition instructing unit 114 are thus configured to be generated on the main storage device.

While the image forming apparatus is taken as an example and explained in the embodiment, the present invention is not limited thereto and may be applied to other apparatuses. For example, it is possible to make an application to an information processing device such as a projector and a tablet terminal.

According to the embodiment, since log information output by multiple programs is recorded in multiple log files, and the multiple log files are integrated into one collected log file and recorded in the storage unit in the chronological order, there is an advantage in that it is possible to improve the information tracking performance in an occurrence of a trouble over multiple programs in an information processing device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
a storage device;
a memory having computer readable instructions stored thereon; and
at least one processor configured to execute the computer readable instructions to,
set desired threshold log size values for each of a plurality of programs,
execute the plurality of programs,
record pieces of log information output by each of the plurality of programs in a corresponding one of a plurality of log files, the plurality of log files each including operational information, status information, and error information,
determine whether at least one of the plurality of log files exceeds the set desired threshold log size value for the respective program of the plurality of programs,
integrate each of the plurality of log files into one collected log file and record the collected log file in the storage device, the integrating including joining chunks of each of the plurality of log files in chronological order, and
record the collected log file sequentially when the pieces of log information exceed a desired threshold value set in advance for a log collection program of the plurality of programs that outputs a piece of the pieces of log information which exceeds the desired threshold.

2. The information processing device according to claim 1, wherein the at least one processor is further configured to execute the computer readable instructions to:
instruct a transition to a low voltage driving condition in which a power supply is set to a lower voltage in a standby state than a power supply voltage in a normal driving condition, and
record, in the collected log file, all pieces of log information not recorded in the collected log file of the plurality of programs when the transition to the low voltage driving condition is instructed by the processor.

3. The information processing device according to claim 1, wherein the at least one processor is further configured to execute the computer readable instructions to:
set a size of a cache in which each of the plurality of log files are recorded.

4. An information processing method to be executed by an information processing device including a storage device, the information processing method comprising:
setting, using at least one processor, desired threshold log size values for each of a plurality of programs;
executing, using the at least one processor, the plurality of programs;
recording, in the storage device, pieces of log information output by each of the plurality of programs in a corresponding one of a plurality of log files, the plurality of log files each including operational information, status information, and error information;
determining, using the at least one processor, whether at least one of the plurality of log files exceeds the set desired threshold log size value for the respective program of the plurality of programs;
integrating, using the at least one processor, each of the plurality of log files into one collected log file and recording the collected log file in the storage device, the integrating including joining chunks of each of the plurality of log files in chronological order; and
recording, in the storage device, the collected log file sequentially when the pieces of log information exceed a second desired threshold value set in advance for a log collection program of the plurality of programs that outputs a piece of the pieces of log information which exceeds the second desired threshold.

5. A non-transitory computer-readable storage medium with an executable program stored thereon, wherein when the program is executed by at least one processor, the program configures the at least one processor to:
set desired threshold log size values for each of a plurality of programs;
execute the plurality of programs;
record, in a storage device, pieces of log information output by each of the plurality of programs in a corresponding one of a plurality of log files, the plurality of log files each including operational information, status information, and error information;
determine whether at least one of the plurality of log files exceeds the set desired threshold log size value for the respective program of the plurality of programs;
integrate the plurality of log files into one collected log file and record the collected log file in the storage device, the integrating including joining chunks of each of the plurality of log files in chronological order; and
record the collected log file sequentially when the pieces of log information exceed a second desired threshold value set in advance for a log collection program of the plurality of programs that outputs a piece of the pieces of log information which exceeds the second desired threshold.

* * * * *